United States Patent
Foerster et al.

(10) Patent No.: US 9,533,668 B2
(45) Date of Patent: Jan. 3, 2017

(54) RAIL VEHICLE BRAKING DEVICE

(71) Applicant: SIEMENS AKTIENGESELLSCHAFT, Munich (DE)

(72) Inventors: Till Foerster, Fuerth (DE); Stefan Hassler, Kirchenthumbach (DE); Reiner Heilmann, Egmating (DE); Jean-Pascal Schwinn, Munich (DE); Thorsten Stützle, Nuremberg (DE); Manfred Wiesand, Burgthann (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 133 days.

(21) Appl. No.: 14/382,066

(22) PCT Filed: Feb. 28, 2013

(86) PCT No.: PCT/EP2013/054074
§ 371 (c)(1),
(2) Date: Aug. 29, 2014

(87) PCT Pub. No.: WO2013/127942
PCT Pub. Date: Sep. 6, 2013

(65) Prior Publication Data
US 2015/0081145 A1  Mar. 19, 2015

(30) Foreign Application Priority Data
Feb. 29, 2012  (DE) .......................... 10 2012 203132

(51) Int. Cl.
*B60T 17/22* (2006.01)
*B60L 7/00* (2006.01)
(Continued)

(52) U.S. Cl.
CPC ................ *B60T 17/228* (2013.01); *B60L 7/00* (2013.01); *B60T 8/1705* (2013.01); *B61H 9/06* (2013.01);
(Continued)

(58) Field of Classification Search
CPC ........... B60T 17/228; B61H 11/00; B61H 9/06
See application file for complete search history.

(56) References Cited

U.S. PATENT DOCUMENTS

| 5,517,093 A | 5/1996 | Augustyniak et al. |
| 5,614,796 A * | 3/1997 | Minderlein ............... B60L 3/00 246/182 A |

(Continued)

FOREIGN PATENT DOCUMENTS

| CN | 101959708 A | 1/2011 |
| DE | 102010005938 A1 | 7/2011 |

(Continued)

*Primary Examiner* — Tuan C. To
(74) *Attorney, Agent, or Firm* — Laurence Greenberg; Werner Stemer; Ralph Locher

(57) ABSTRACT

A rail vehicle braking device has at least one first electrodynamic brake with a drive unit that includes at least one drive motor and a power supply unit for supplying the drive motor in a traction mode of the drive unit. A brake control unit controls, in a first brake mode, the respective power supply unit for providing a braking effect. In order to optimize the system with a fall-back measure in case of a braking effect loss in respect of the cause thereof, there is provided at least one sensor unit, which detects a braking effect parameter for the first braking mode of the brake. A monitoring device is assigned to the first brake. It is independent of the brake control unit and considers, in a first monitoring mode, the braking effect parameter for the introduction of a fall-back measure concerning the brake.

19 Claims, 4 Drawing Sheets

(51) Int. Cl.
  *B60T 8/17* (2006.01)
  *B61H 11/00* (2006.01)
  *B61H 13/34* (2006.01)
  *B61H 9/06* (2006.01)
(52) U.S. Cl.
  CPC .............. *B61H 11/00* (2013.01); *B61H 13/34* (2013.01); *B60L 2200/26* (2013.01)

(56) References Cited

U.S. PATENT DOCUMENTS

| | | | |
|---|---|---|---|
| 5,828,979 A | 10/1998 | Polivka et al. | |
| 6,456,909 B1 | 9/2002 | Shimada et al. | |
| 7,164,247 B2* | 1/2007 | Joe | B60K 6/445 180/65.22 |
| 7,392,871 B2* | 7/2008 | Severinsky | B60H 1/004 180/233 |
| 7,949,443 B2 | 5/2011 | Lin et al. | |
| 8,143,734 B2* | 3/2012 | Steudel | F03D 1/003 290/43 |
| 8,630,760 B2* | 1/2014 | Kang | B60W 10/06 701/22 |
| 2005/0121976 A1* | 6/2005 | O'Dea | B60T 8/1755 303/146 |
| 2006/0017414 A1* | 1/2006 | Joe | B60K 6/445 318/432 |
| 2007/0001508 A1* | 1/2007 | Schluter | B60T 7/042 303/114.3 |
| 2008/0288147 A1* | 11/2008 | Cesario | B60T 8/174 701/70 |
| 2009/0125170 A1 | 5/2009 | Noffsinger et al. | |
| 2009/0224706 A1 | 9/2009 | Jobard | |

FOREIGN PATENT DOCUMENTS

| | | |
|---|---|---|
| EP | 2251224 A1 | 11/2010 |
| RU | 2192974 C2 | 11/2002 |

\* cited by examiner

RAIL VEHICLE BRAKING DEVICE

BACKGROUND OF THE INVENTION

Field of the Invention

The invention relates to a rail vehicle braking device comprising at least one first electrodynamic brake, which comprises a drive unit, which has at least one drive motor and a power supply unit for supplying power to the drive motor in a traction mode of the drive unit, and at least one braking regulation unit, which has the respective power supply unit and at least one braking control unit, which, in a first braking mode, controls the respective power supply unit so as to provide a braking effect.

Rail vehicles in which a braking force is generated by electric motors are known. The kinetic energy of the vehicle converted regeneratively into electrical energy during the braking by the motors is converted into heat, for example via a braking resistor, or fed back to the rail road supply grid or else to a mobile storage unit.

In addition to the electrodynamic, regenerative brake, the rail vehicles generally furthermore have a full-service friction brake, in which the braking effect is achieved pneumatically, hydraulically and/or mechanically.

In braking systems, it is conventional to distinguish between the types of braking "service braking" and "emergency braking" (also referred to as "quick-response braking" or "hazard braking"). While service braking is used for reducing the velocity of the train, even until it is at a standstill, there are more restrictive demands placed on emergency braking beyond this which ensure the greatest possible safety for passengers, staff and others. Generally, the electrodynamic brake is preferably used for service braking.

In the case of emergency braking, the regenerative brake is generally not used without simultaneous actuation of the friction brake. The reason for this consists in the until now lower level of failsafety of the electrodynamic brake in comparison with the pneumatic or hydraulic friction brake, with the result that, until now, the greatest possible braking safety can only be achieved using the friction brakes.

However, in the extreme case, which is generally the case for subway trains, this means that a motor car of a train with the friction brake and the electrodynamic brake has in principle two full-service braking units, wherein each can itself generate, within a wide travel velocity range, a braking torque which is sufficient for maintaining the specified braking distances so that, in this respect, one braking unit could be used in place of the other.

The two braking units have different advantages. While the friction brake ensures greater safety in the case of emergency braking, the regenerative brake has economic advantages. Thus, for example, there is no wear in brake linings and brake disks. In addition, partial utilization of the transformed kinetic energy is possible.

BRIEF SUMMARY OF THE INVENTION

The invention is based on the object of increasing the safety of the electrodynamic brake.

In this regard, it is proposed that the rail vehicle braking device has at least one sensor unit, which is provided for detecting at least one braking effect characteristic quantity for the first braking mode of the brake, and at least one first braking monitoring apparatus, which is assigned to the first brake, is independent of the closed-loop braking control unit (braking regulation unit) and is provided for taking into consideration the braking effect characteristic quantity for initiating a fallback measure relating to the brake in a first monitoring mode. As a result, a rail vehicle braking device can be provided which has an advantageous differentiation capacity in terms of the identification and handling of errors of the braking control and a high level of safety in respect of systematic errors.

In comparison with a conventional solution, in which an overall delay of the rail vehicle is detected and, depending on this, a fallback measure which is undifferentiated in respect of all braking systems of the rail vehicle is initiated, faulty operation of the braking regulation unit can advantageously be identified as relating to the drive unit and it is possible for a fallback measure for the brake to which the drive unit belongs to be initiated separately.

If the rail vehicle has at least one second drive unit which, with the power supply unit thereof and at least one assigned drive motor, is part of a second electrodynamic brake, advantageous localization of a braking effect loss in the case of the drive unit of the first brake can be achieved by means of the braking monitoring apparatus assigned to the first brake, wherein the fallback measure is advantageously initiated for the first brake and the second brake preferably remains unaffected in respect of the initiation of the fallback measure.

"Taking into consideration" of the braking effect characteristic quantity by the braking monitoring apparatus is intended in particular to be understood to mean that an evaluation and decision-making process, which is expediently implemented in the braking monitoring apparatus, takes place on the basis of the braking effect characteristic quantity. If the initiation of the fallback measure takes place on the basis of a plurality of evaluation and decision-making processes, all of the units of the rail vehicle participating in this are considered as belonging to the braking monitoring apparatus.

A braking monitoring apparatus which is "independent of the braking regulation unit" is intended in particular to mean that the evaluation and decision-making processes implemented in the braking monitoring apparatus are independent of processes of the closed-loop braking control unit of the first brake. Owing to the independence of the braking monitoring apparatus from the braking regulation unit, advantageous isolation of the control functions and the monitoring functions of the first brake can be achieved, wherein a high degree of safety with respect to the spread of systematic errors from a control or regulation unit to a monitoring unit can be achieved. In comparison with a solution in which the drive control device assigned to the drive unit participates in an evaluation and decision-making process in monitoring, an advantageous feedback-free actuation and monitoring of the electrodynamic brake can be achieved.

The braking monitoring apparatus assigned to the first brake and the braking regulation unit of the first brake are expediently in the form of physically separate units.

For example, by means of the braking monitoring apparatus, a comparison of the braking effect characteristic quantity or of a variable determined on the basis of said braking effect characteristic quantity with a setpoint value for a sufficient braking effect of the brake can take place. "Taking into consideration" can in particular be understood to mean "processing" or "evaluating".

A "braking effect characteristic quantity for the first braking mode of the brake" should in particular be understood to mean a characteristic quantity which can be used to obtain at least one item of information relating to a braking effect of the electrodynamic brake in the first braking mode thereof. On the basis of the braking effect characteristic quantity, the braking effect assigned to the drive unit and which is generated or can be generated during the implementation of the first braking mode can expediently be determined by the braking monitoring apparatus.

A "braking effect" can in particular be understood to mean a braking force or a braking torque which can be transmitted onto a rail vehicle wheelset. If the drive unit is drive-coupled to a drive axle, the braking effect related to this drive axle can be determined by the braking effect characteristic quantity and taken into consideration. If the drive unit is drive-coupled to all of the drive axles of a truck, the braking effect related to the truck can be determined by the braking effect characteristic quantity and taken into consideration. Hereby, advantageously an axle-related or truck-related braking effect can be determined and taken into consideration by the braking monitoring apparatus.

The braking effect can be a braking effect achieved by means of the electrodynamic brake or a braking effect achievable by operation of the braking control unit. In the first-mentioned alternative, the sensor unit serves the purpose of detecting at least one operational characteristic quantity, such as, for example, an instantaneous acceleration characteristic quantity, a braking force characteristic quantity, a braking torque characteristic quantity, etc. In the last-mentioned alternative, the sensor unit can serve the purpose of evaluating control signals generated by the active braking control unit for controlling the power supply unit in order to determine a braking effect achievable by the control signals.

The sensor unit can be formed by a sensor which, in order to detect the braking effect characteristic quantity, is expediently coupled to a rail vehicle wheelset, which is drive-coupled to the drive unit. The sensor unit can also have a set of sensors, which each output a braking effect characteristic quantity, wherein the braking effect characteristic quantities can be different from one another. These braking effect characteristic quantities can be, for example, a braking force, a braking torque, a delay, a power in an intermediate circuit, etc. The sensor unit can be used by a plurality of independent braking monitoring devices and/or further functional systems of the rail vehicle, wherein a further gain in safety can be achieved by virtue of the fact that the sensor unit is used without any feedback. This can be achieved, for example, by virtue of the fact that lines between the sensor unit and the different systems are galvanically decoupled in order to keep the systems independent from one another.

The power supply unit preferably has controllable electronic elements, which are controlled in the traction mode in accordance with a control strategy, in respect of a specific drive torque to be achieved, for supplying at least one assigned drive motor with a corresponding electrical power. The controllable elements are in particular in the form of switching or valve elements, which generate a power flow with a matched voltage, frequency and/or current intensity and with which the assigned drive motor is driven by means of switching operations corresponding to a switching strategy. In particular, the power supply unit can be in the form of an inverter, which, in the traction mode, draws the required energy from an intermediate circuit, for example a DC link.

In a braking mode of the electrodynamic brakes, the respective power supply unit or the controllable elements thereof are expediently controlled by means of the assigned braking control unit in such a way that, by means of the at least one drive motor which is operatively connected to the power supply unit, a braking torque is generated which can be transmitted onto an axle of the rail vehicle.

In an advantageous embodiment of the invention, it is proposed that the braking monitoring apparatus has at least two monitoring devices, as a result of which advantageous redundancy in respect of the monitoring task of the braking monitoring apparatus can be achieved.

In this context, it is further proposed that the monitoring devices are provided for implementing, at least partially in interaction, at least one monitoring function of the first monitoring mode. An implementation of a monitoring function which takes place as a result of a plurality of units "at least partially in interaction" is in particular intended to be understood to mean that the monitoring function has at least one function step, which is implemented by each unit in each case for providing an independent result, and at least one function step which is implemented on the basis of a combination of the results. As a result, a high level of protection against systematic errors can be achieved by virtue of, for example, the results of independent evaluations of the braking effect characteristic quantity in each unit being combined with one another before the fallback measure is initiated.

Particularly advantageously, at least two braking effect characteristic quantities which are different in nature can be sensed by the sensor unit, and each of these braking effect characteristic quantities is evaluated by a different monitoring device. In this case, the braking effect characteristic quantities are preferably sensed independently of one another, as a result of which an increased level of protection against systematic errors can be achieved. The nature of the sensed braking effect characteristic quantities can expediently be determined by the implementation of the respective monitoring mechanism of the monitoring devices.

In a further embodiment of the invention, it is proposed that the monitoring devices differ from one another with respect to their structural and/or algorithmic design. By virtue of the use of different technologies for the monitoring devices of the braking monitoring apparatus, a particularly high level of safety can be achieved since a system with a diverse redundancy can be provided. Particularly advantageously, the spread of a possible systematic fault which is specific to a certain technology from a first monitoring device to a second monitoring device can be avoided. The term "structural" preferably relates to hardware used for the monitoring device and the term "algorithmic" preferably relates to an implementation of at least one monitoring function by means of software. Different implementations of the first monitoring mode can advantageously be achieved by the structural and/or algorithmic differences between the monitoring devices of the braking monitoring apparatus.

With respect to the algorithmic embodiment, in this context it is proposed that the monitoring devices each have software for executing a monitoring function, wherein the software is implemented differently. A "different implementation" of a monitoring function can in particular be understood to mean that the software provided for executing this monitoring function of the first monitoring device differs from the software provided for executing the monitoring function of the second monitoring device in respect of the algorithm and/or the programming code. In this case, it is advantageous if the software of the first and second monitoring devices is set up by means of different design tools. Furthermore, it is advantageous if the software of the monitoring devices is developed by different people.

With respect to the structural embodiment, it is additionally proposed that one of the monitoring devices is in the form of purely hardware-based control. In this case it should in particular be understood that the hardware control relevant for the execution of the monitoring function takes place without the use of software. The protection against systematic errors in the implementation of the first monitoring mode can additionally be increased if the rail vehicle braking device has a monitoring unit, which is used for performing the first monitoring mode at least partially in interaction with the monitoring devices. The monitoring devices and the monitoring unit are preferably formed by separate structures or in each case by separate hardware.

An advantageous high diverse redundancy can be achieved in a monitoring mode if the monitoring devices and the monitoring unit differ from one another with respect to their structural and/or algorithmic design.

In an advantageous development of the invention, it is proposed that the monitoring devices of the braking monitoring apparatus and the monitoring unit are each provided for outputting an error signal during execution of the first monitoring mode depending on a braking effect characteristic quantity, wherein this braking monitoring apparatus has at least one trigger unit, which is operatively connected to the monitoring devices and the monitoring unit in such a way that the initiation of the fallback measure presupposes the presence of at least two error signals. As a result, a high level of protection against erroneous initiation of the fallback measure can advantageously be achieved. An error signal is expediently output by a monitoring device or by the monitoring unit if an erroneous braking effect of the brake is identified by an evaluation of the first braking effect characteristic quantity in the monitoring device or in the monitoring unit. An identical braking effect characteristic quantity can be taken into consideration by the monitoring devices and the monitoring unit. Alternatively, in each case a different braking effect characteristic quantity can be taken into consideration for at least two of these units. In particular, the monitoring devices and the monitoring unit can each take into consideration a different braking effect characteristic quantity.

In a further development of the invention, it is proposed that the braking regulation unit has at least two braking control units and a switching unit, which is provided for switching over between the first braking mode of the braking regulation unit, in which the first braking control unit controls the power supply unit so as to provide a braking effect, and a second braking mode of the braking regulation unit, in which the second braking control unit controls the power supply unit so as to provide a braking effect, in order to implement the fallback measure. As a result, advantageous redundancy in the control function of the braking regulation unit can be provided, wherein the implementation of the second braking mode can advantageously act as fallback measure in the case of an insufficient braking effect in the first braking mode.

In the second braking mode of the braking regulation unit, the respective first braking control unit can continue to be operated by virtue of the second braking control unit being connected by means of the switching unit. In this case, a lack of braking effect is intended to be compensated for by means of the second braking control unit. In a preferred embodiment of the invention, however, it is proposed that the first braking control unit is in an inactive state in the second braking mode. As a result, undesired effects of erroneous operation of the first braking control unit can largely be avoided. In this case, the switching unit expediently effects switchover between the two braking control units.

In order to increase the reliability of the electrodynamic brake, in a further embodiment of the invention it is proposed that the rail vehicle braking device has a test mode, in which the switching unit of the braking regulation unit is tested.

The braking control units advantageously differ from one another with respect to their structural and/or algorithmic design. The differences in the structural embodiment and/or in the algorithmic embodiment preferably relate to functions of the braking control units which are relevant to the activation of the power supply unit or of controllable elements thereof. In this proposed embodiment, the braking control units, in an embodiment of the power supply unit with switching or valve elements, can control the switching or valve elements in accordance with two different switching strategies. In this case, the switching strategy of the first braking control unit is advantageously different than the switching strategy of the second braking control unit.

In this context, it is proposed that the braking monitoring apparatus, in the first monitoring mode, has a first monitoring function, in which this braking monitoring apparatus is in the form of a first braking effect monitoring unit, which is provided for monitoring the brake in the first braking mode thereof, and at least one second monitoring function, in which this braking monitoring apparatus is in the form of a second braking effect monitoring unit, which is provided for monitoring the brake in the second braking mode thereof. As a result, the first brake can advantageously be monitored by the same braking monitoring apparatus and as a result advantageously by an identical structure or hardware both in the first braking mode and in the second braking mode of said brake.

If a monitoring unit is provided which is used for implementing the first monitoring mode at least partially in interaction with the monitoring devices of the braking monitoring apparatus, the monitoring devices and the monitoring unit can each be provided to output an error signal during the implementation of the first monitoring function depending on the first braking effect characteristic quantity, wherein the first braking effect monitoring unit has a trigger unit for actuating the switching unit, which trigger unit is operatively connected to the monitoring devices, the monitoring unit and the switching unit in such a way that the actuation presupposes the presence of at least two error signals.

In accordance with a further configuration of the invention, the rail vehicle braking device has a further braking apparatus and a switching device, wherein, as fallback measure, this further braking apparatus is actuated by means of the switching device depending on the braking effect characteristic quantity. As a result, in the case of faulty operation of the braking regulation unit, an additional braking effect can be provided by means of the further braking apparatus.

In an embodiment which is simple in design terms, it is proposed that this braking apparatus is in the form of a parking brake.

In addition, it is possible to provide alternative brakes as an embodiment of the further braking apparatus, which alternative brakes in particular have greater performance than a parking brake. Thus, for example, in order to provide a sufficient braking effect, brakes can be used which deviate from the regenerative principle of an electrodynamic brake and demonstrate their braking effect by virtue of a pressure increase in pneumatic or hydraulic brake cylinders. In addition, an electromagnetic track brake, which is operated by pneumatic, hydraulic and/or mechanical actuation of an actuator in conjunction with a magnetic or permanent-magnetic field generated by a current, can be used as further braking apparatus. Furthermore, a braking system based on the principle of eddy currents is possible. Connection of or an increase in braking effects by means of at least one further braking apparatus can take place until all available brakes are completely connected.

It is additionally proposed that the switching device is actuable during the implementation of the second monitoring function by the second braking effect monitoring unit. As a result, advantageous monitoring of the second braking control unit of the braking regulation unit to be monitored and a further fallback measure in addition to the implementation of the second braking mode can be achieved.

If a monitoring unit is provided which is used for implementing the first monitoring mode at least partially in interaction with the monitoring devices of the braking monitoring apparatus, the monitoring devices and the monitoring unit can in each case be provided to output an error signal during implementation of the second monitoring function depending on the first braking effect characteristic quantity, wherein the second braking effect monitoring unit has a trigger unit for actuating the switching device, which trigger unit is operatively connected to the monitoring devices, the monitoring unit and the switching device in such a way that the actuation presupposes the presence of at least two error signals.

In a further advantageous embodiment of the invention, it is proposed that the rail vehicle braking device comprises at least one second electrodynamic brake, which comprises a drive unit, which has at least one drive motor and a power supply unit for supplying power to the drive motor in a traction mode of the drive unit, and at least one braking regulation unit, which has the respective power supply unit and at least one braking control unit, which, in a first braking mode, controls the respective power supply unit so as to provide a braking effect.

In this context, it is proposed that the rail vehicle braking device has at least one sensor unit, which is provided for detecting at least one braking effect characteristic quantity for the first braking mode of the second brake, and at least one second braking monitoring apparatus, which is assigned to the second brake, is independent of the braking regulation unit of the second brake and is provided for taking into consideration this braking effect characteristic quantity for initiating a fallback measure relating to the second brake in a second monitoring mode. As a result, an advantageous differentiation capacity in the error identification and error handling in respect of two different electrodynamic brakes can be achieved.

The sensor unit for sensing the braking effect characteristic quantity for the first brake and the sensor unit for sensing the braking effect characteristic quantity for the second brake can be formed by separate structures or at least partially by the same structure or the same hardware.

In addition, it is proposed that the rail vehicle braking device has a monitoring unit, which is a common part of the first braking monitoring apparatus and the second braking monitoring apparatus. The structure or the hardware of the monitoring unit is expediently used in combination with the various braking monitoring apparatuses for different electrodynamic brakes, as a result of which installation space and component parts can be saved.

In addition, it is proposed that the first braking monitoring apparatus, which is assigned to the first brake, is formed at least by the braking regulation unit of the second brake. As a result, the braking mode of the second brake and the monitoring mode of the braking monitoring apparatus for the first brake can be implemented by means of the same physical structure, or in other words by means of the same hardware, of the second brake. As a result, feedback-free monitoring of the first brake can be achieved.

Advantageously, the braking regulation unit of the second brake has at least two braking control units and a switching unit, which is provided for switching over between the first braking mode of the braking regulation unit, in which the first braking control unit controls the respective power supply unit so as to provide a braking effect, and a second braking mode of the braking regulation unit, in which the second braking control unit controls the respective power supply unit so as to provide a braking effect, in order to implement the fallback measure, wherein the monitoring devices of the first braking monitoring apparatus are each formed by a different braking control unit of the braking regulation unit of the second brake forming this braking monitoring apparatus.

Expediently, the first braking monitoring apparatus assigned to the first brake is formed at least by the braking regulation unit of the second brake, wherein the second braking monitoring apparatus assigned to the second brake is formed at least by the braking regulation unit of the first brake. As a result, advantageous mutual, in particular crossed-over monitoring of the electrodynamic brakes can be achieved.

The invention is also based on a method for braking a rail vehicle with a first electrodynamic brake, wherein the brake comprises in each case a drive unit, which has at least one drive motor and a power supply unit for supplying power to the drive motor in a traction mode of the drive unit, and at least one braking regulation unit, which has the respective power supply unit and at least one braking control unit, in which the power supply unit of the first brake is controlled so as to provide a braking effect in a first braking mode thereof.

It is proposed that at least one first braking effect characteristic quantity is detected for the first braking mode of the first brake, in a first monitoring mode, the first braking effect characteristic quantity is taken into consideration by a first braking monitoring apparatus, which is assigned to the first brake and is independent of the braking regulation unit, and a fallback measure relating to the first brake is initiated depending on the first braking effect characteristic quantity.

In respect of the advantageous effects of the proposed method, reference is made to the statements above relating to the rail vehicle braking device in order to avoid unnecessary repetition.

BRIEF DESCRIPTION OF THE SEVERAL VIEWS OF THE DRAWING

Exemplary embodiments of the invention will be explained with reference to the drawings, in which.

DESCRIPTION OF THE INVENTION

Figure 1:
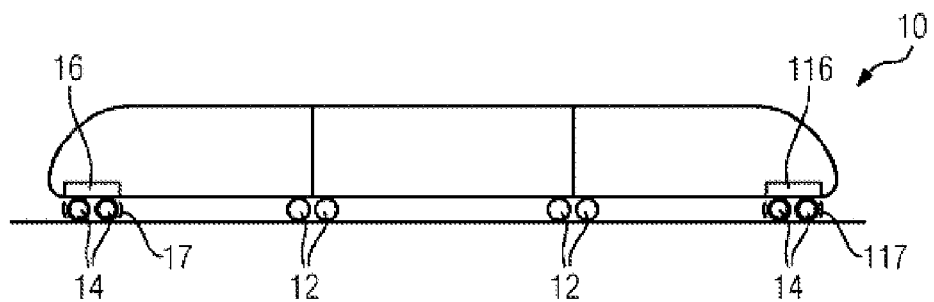
FIG. 1 shows a rail vehicle comprising drive axles and drive units assigned thereto.

FIG. 1 shows a rail vehicle 10 in the form of a traction vehicle in a very schematized side view. It has idler axles 12 and drive axles 14, which are driven in a traction mode by means of drive units 16, 116. A braking operation of the rail vehicle 10 takes place by means of the drive units 16, 116, which in this case each have the function of an electrodynamic brake. For braking operations at low velocities, in each case a further braking apparatus 17, 117 is provided, which is in the form of a parking brake (illustrated schematically in the figure) embodied as a spring-loaded brake.

The control of the drive unit 16 as part of an electrodynamic brake will be explained in more detail with reference to FIG. 2. The drive unit 16 has at least one drive motor 18, which can be in the form of an AC machine. In order to supply electrical power to the drive motor 18, the drive unit 16 furthermore comprises a power supply unit 20, which is operatively connected to the drive motor 18. In an embodiment which is not shown, the drive unit 16 can have a plurality of drive motors, which are supplied power by the same power supply unit 20. The power supply unit 20 is known from the prior art and has an inverter (not illustrated in any more detail), which, in a traction mode of the drive unit 16, generates a current which is variable in voltage and frequency according to the power to be provided for the drive motor 18 starting from a DC link, by virtue of the actuation of electronic switching elements, also referred to as "valves". The energy available in the DC link is drawn from a high-voltage grid supply 26, which is operatively connected to a railroad grid supply via further electrical conversion devices (not illustrated), such as in particular a transformer or a voltage converter, a rectifier, etc. In the traction mode of the drive unit 16, the switching elements of the inverter are controlled in accordance with a switching strategy in order to generate, via the drive motor 18, a drive torque onto the assigned drive axles 14.

The drive motor 18 forms, together with a closed-loop braking control unit 22, an electrodynamic brake 24. The braking regulation unit 22 comprises, in addition to the power supply unit 20, two braking control units 28 and 30, which are each provided to control, in an active state, the power supply unit 20 for a braking operation of the electrodynamic brake 24. The braking control units 28, 30 are each provided for controlling, in a braking mode of the drive unit 16, the switching elements of the inverter of the power supply unit 20 in accordance with a switching strategy in such a way that a braking torque is exerted on the assigned drive axle 14 via the drive motor 18. During a braking operation by means of the electrodynamic brake 24, the drive motor 18 acts as a generator, wherein the energy converted into electrical current in the braking operation is converted into heat by means of a braking resistor 31. As an alternative or in addition, the energy can be fed back to the high-voltage grid supply 26, used on the vehicle or stored in a mobile storage unit.

The first braking control unit 28 is operatively connected to the power supply unit 20 via a switching unit 32, whose function will be explained further below. In addition to an interface for the power supply unit 20, the braking control unit 28 has further interfaces, by means of which it is operatively connected to a sensor unit 34. The sensor unit 34 is used for detecting a velocity characteristic quantity v and a mass characteristic quantity m, which represent input signals for the generation of control signals by the braking control unit 28. The braking control unit 28 is furthermore operatively connected to the rail vehicle management system via further interfaces by virtue of it being connected to a databus 36 of the rail vehicle 10, and to the rail vehicle main overhead line 38. Via these further interfaces, further input parameters for the braking control unit 28 can be provided, such as in particular a characteristic quantity which, in the case of service braking, represents a braking effect which is set by the vehicle driver or by an automatic vehicle control system. The braking control unit 28 is supplied electrical energy via a vehicle electric power supply 40 and is additionally operatively connected to a vehicle emergency brake line 42 via an interface 41, via which vehicle emergency brake line emergency braking of the rail vehicle 10 can be initiated.

On the basis of the abovementioned input parameters, the braking control unit 28, in a first braking mode, in which it is in an active state, generates control signals 44, which are controlled by the power supply unit 20 corresponding to a specific braking effect to be achieved, in particular corresponding to a specific braking torque to be achieved. For this purpose, the braking control unit 28 has at least one arithmetic logic unit 46 and a memory unit 48, in which software is stored. In particular the braking mode switching strategy for the switching elements of the inverter is programmed in this software.

A first braking effect monitoring unit 50 of a first braking monitoring apparatus 53 is assigned to the braking control unit 28 and is provided to monitor the braking effect which is achieved or can be achieved by the electrodynamic brake 24. For this purpose, a braking effect characteristic quantity, in particular a braking torque characteristic quantity, is used and compared with a setpoint value. The braking effect characteristic quantity can be detected, for example, by means of an acceleration sensor and/or determined by means of an evaluation of the velocity characteristic variable v. As an alternative or in addition, the braking effect characteristic quantity can be determined by means of monitoring the control signals 44 generated by the braking control unit 28. Exemplary detection of the braking effect characteristic quantity, which is denoted by the reference sign B1, is illustrated schematically in FIG. 3 by a sensor unit 58 or 158.

The braking regulation unit 22 comprises, as already mentioned above, a second braking control unit 30. This is provided for implementing at least the control function described above for the first braking control unit 28 for controlling the power supply unit 20 in a second braking mode of the drive unit 16. It is used in particular for taking on the control of the power supply unit 20 in the event of faulty operation of the first braking control unit 28.

If it is identified by means of the first braking effect monitoring unit 50 that the braking effect which is generated or can be achieved by the electrodynamic brake 24 is insufficient, the braking control unit 28 is considered as faulty and, as a fallback measure, there is a switchover by means of the switching unit 32 to a second braking mode of the electrodynamic brake 24, in which the second braking control unit 30, in its active state, controls the power supply unit 20 so as to provide a braking effect. In this second braking mode, the first, faulty braking control unit 28 is switched into an inactive state.

In order to prevent driving during operation of the second braking control unit 30 in the second braking mode, it is advantageous if, with the switchover by the switching unit 32, isolation from the high-voltage grid supply 26 also takes place. This takes place by means of a grid disconnector switch 51.

A second braking effect monitoring unit 52 of the braking monitoring apparatus 53 is assigned to the second braking control unit 30. The braking effect monitoring units 50, 52 can be formed by units which are physically separate from one another or they can be formed at least partially by a common structure. In particular, the braking effect monitoring units 50, 52 can be formed completely by the same structure. The second braking effect monitoring unit 52 is provided for monitoring the braking effect which is or can be achieved by means of the electrodynamic brake 24 in the second braking mode thereof with the second braking control unit 30. For this purpose, as already described above, a braking effect characteristic quantity, in particular a braking torque characteristic quantity, is detected or determined and compared with a setpoint value. This braking effect characteristic quantity can in particular correspond to the braking effect characteristic quantity B1.

If it is identified by means of the second braking effect monitoring unit 52 that the braking effect which is generated or can be achieved by the electrodymamic brake 24 is insufficient, the braking control unit 30 is considered to be faulty and, as a fallback measure, the further braking apparatus 17 is actuated by means of a switching device 54 controlled by the second braking effect monitoring unit 52.

The braking control units 28, 30 are based on different technologies. A technology includes the structural, or hardware-based, and/or the algorithmic, or software-based design. In an exemplary configuration, the first braking control unit 28 can be in the form of a signal processor (also referred to as "SIP"), wherein the algorithmic implementation can correspond to field-oriented control. The second braking control unit 30 can be in the form of a field programmable gate array (FPGA), wherein the algorithmic implementation can correspond to switching-oriented control.

In accordance with an alternative embodiment, the second braking control unit 30 is designed in such a way that the activation of the power supply unit 20 takes place exclusively by a functionality realized by means of hardware, without the use of software, while the first braking control unit 28 is based on a hardware-based and software-based implementation of the control functions.

If the two braking control units 28, 30 are based on a software-based implementation in respect of at least one control function, the corresponding software is implemented differently in the braking control units 28, 30. In this case, in particular, the programming codes provided for executing the control function differ in that the codes are established by different people and/or different tools, for example.

By virtue of the different embodiments of the braking control units 28, 30, the switching elements of the inverter of the power supply unit 20 are controlled by the first braking control unit 28 in accordance with a first switching strategy and by the second braking control unit 30 in accordance with a second switching strategy, which is different than the first switching strategy.

In order that the switchover from one braking control unit to the other takes place reliably, the switching unit 32 assigned to the drive unit 16 is tested for its functionality at regular and sufficiently short time intervals. For example, when the rail vehicle 10 is at a standstill, for example during upgrading or performance of a brake test, the activation of the switching elements of the inverter is generated in accordance with a certain test pattern by one of the braking control units 28, 30. At least one sensor unit is provided for this purpose, which sensor unit has, for example, a phase current transformer and/or a DC link voltage transformer and which detects an effect of the activation. Once the test with the first braking control unit 28 has been performed, the second braking control unit 30 is switched into its active state by means of the switching unit 32 and the test is repeated, preferably with a different test pattern. If an expected shift in the respective test pattern is identified, the switching unit 32 is considered to be fault-free.

Figure 3:
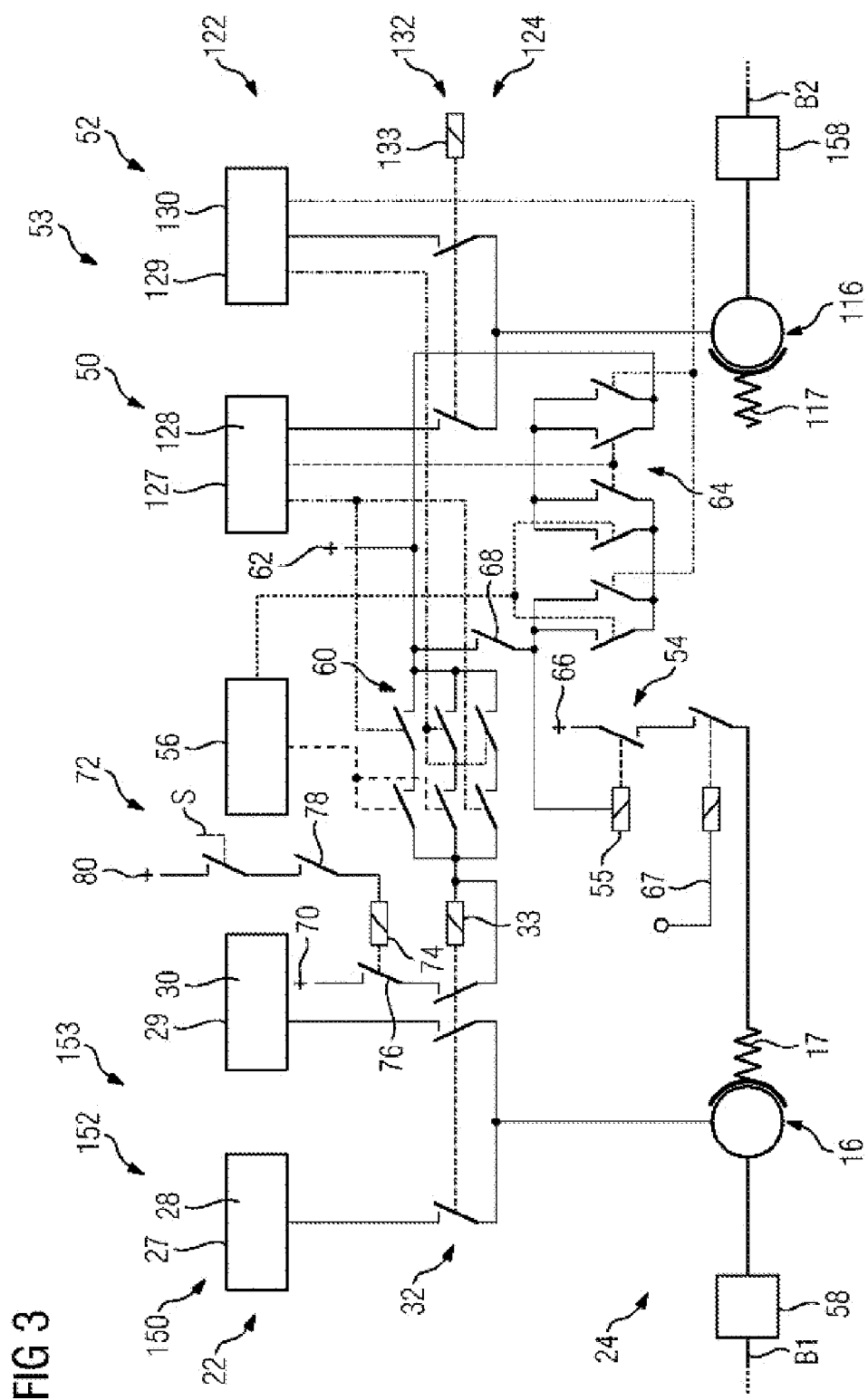
FIG. 3 shows the control circuit shown in FIG. 2 and a further control circuit, which is equipped with a monitoring function.

The above description is also applicable in relation to the drive unit 116, which is part of a second electrodynamic brake 124 of the rail vehicle 10. The power supply unit of the drive unit 116 forms, with the braking control units 128, 130, a braking regulation unit 122, as illustrated in FIG. 3. The braking regulation units 22, 122 of the rail vehicle 10, in each case with their braking control units and their power supply unit, are designed such that, in interaction, they can effect emergency braking by means of the drive motors 18 assigned thereto on the drive axles 14 of the rail vehicle 10. In other words, the braking regulation units 22, 122 are designed to generate, in interaction, a braking torque which is required for implementing emergency braking at least at the drive axles 14.

Exemplary implementation of the braking monitoring apparatus 53 with its braking effect monitoring units 50, 52 will now be described with reference to FIG. 3.

Figure 2:
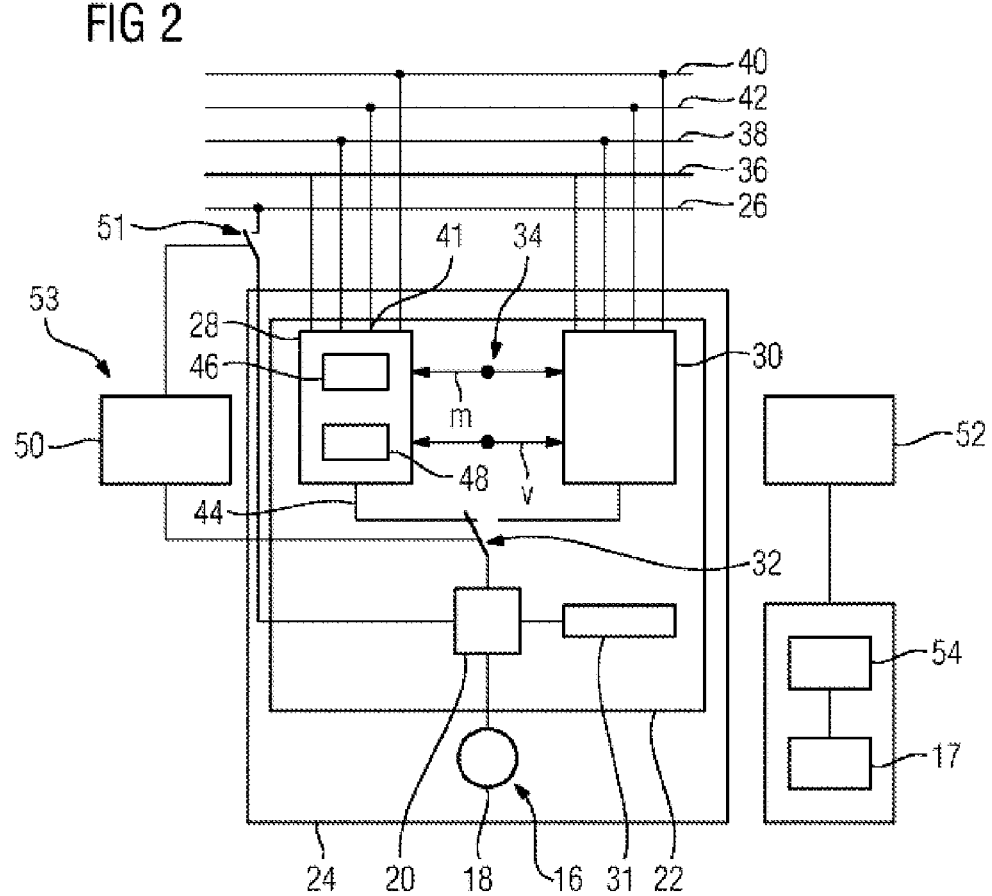
FIG. 2 shows a control circuit for controlling a drive unit in a braking mode, comprising two different braking control units.

FIG. 3 shows, on the left-hand side, the drive unit 16, which comprises, as described above, at least the drive motor 18 and the power supply unit 20 (see FIG. 2). In addition, the braking control units 28, 30, which together with the power supply unit 20 form the braking regulation unit 22, are represented. The braking regulation unit 22 forms, together with the drive motor 18, the electrodynamic brake 24, which will be referred to below as "first electrodynamic brake 24".

The braking regulation unit 22 has the switching unit 32, which is provided for switching over between the first braking mode of the braking regulation unit 22, in which the first braking control unit 28 controls the power supply unit 20 so as to provide a braking effect, and a second braking mode of the braking regulation unit 22, in which the second braking control unit 30 controls power supply unit 20 so as to provide a braking effect, in order to implement a fallback measure of the first brake 24. FIG. 3 illustrates an actuator 33 for actuating the switching unit 32.

The rail vehicle 10 has, as also illustrated in FIG. 1, the further drive unit 116. The drive unit 116, which, in the same way as the drive unit 16, comprises at least one drive motor and a power supply unit, is part of an electrodynamic brake 124, which is largely, in particular completely identical to the electrodynamic brake 24. Reference is therefore made to the description above relating to the electrodynamic brake 24 so as to avoid unnecessary repetition.

The electrodynamic brake 124, which is referred to below as "second electrodynamic brake 124", has the drive motor of the drive unit 116 and a braking regulation unit 122. Said braking regulation unit comprises the power supply unit of the drive unit 116 and two braking control units 128, 130, which are each provided for controlling, in an active state, this power supply unit for a braking operation of the electrodynamic brake 124. The braking regulation unit 122 has a switching unit 132 comprising actuator 133, which switching unit has the same function as the switching unit 32 in the first electrodynamic brake 24; it is provided for switching over between the first braking mode of the braking regulation unit 122, in which the first braking control unit 128 controls the power supply unit of the drive unit 116 so as to provide a braking effect, and a second braking mode of the braking regulation unit 122, in which the second braking control unit 130 controls this power supply unit so as to provide a braking effect, in order to implement the respective fallback measure.

In addition, the mechanical braking apparatus 17, which is assigned to the first electrodynamic brake 24, and the further mechanical braking apparatus 117, which is assigned to the second electrodynamic brake 124, are illustrated.

The monitoring of the first electrodynamic brake 24 described above with reference to FIG. 2 takes place in the exemplary embodiment under consideration at least by means of the braking regulation unit 122 of the second electrodynamic brake 124. Hereby, the braking monitoring device 53 assigned to the first brake 24 is formed at least by the braking regulation unit 122 of the second brake 124.

The braking monitoring device 53 illustrated in FIG. 2 is formed by the braking control units 128, 130 of the braking regulation unit 122 of the second brake 124 and by a further monitoring unit 56 separate therefrom.

The braking monitoring apparatus 53 is provided, in particular programmed, with a first monitoring function, in which this braking monitoring apparatus 53, in addition to the above-described control tasks of the braking control units 128, 130 for controlling the power supply unit of the drive unit 116, is in the form of a first braking effect monitoring unit 50, which is provided for monitoring the first brake 24 in the first braking mode thereof.

This monitoring function is based on a monitoring task described below which is performed by each of the braking control units 128, 130 and the monitoring unit 56 in parallel and largely, in particular completely, independently. These units are each operatively connected to a sensor unit 58, which is provided for detecting or determining a first braking effect characteristic quantity B1 for the first braking mode of the first electrodynamic brake 24.

The braking effect characteristic quantity B1 can be in particular a braking torque characteristic quantity, wherein the sensor unit 58 can be mechanically coupled, for example, to an axle 14 drivable by the drive motor 18 and can be in the form of a torque sensor, for example. The sensor unit 58 is illustrated schematically and can comprise one or more sensors, wherein the sensor unit 58 provides the braking effect characteristic quantity B1 from one or more measured variables.

In a further embodiment, a plurality of braking effect characteristic quantities can be detected by the sensor unit 58, which braking effect characteristic quantities differ from one another in terms of their type and are each evaluated by a different unit of the braking monitoring apparatus 53, as described in more detail below.

As already described above, the braking control units 28, 30 of the first brake 24 are based on different technologies. This applies correspondingly for the braking control units 128, 130. A technology is interpreted as the structural, or hardware-based, and/or the algorithmic, or software-based, design. In an exemplary configuration, the first braking control unit 128 can be in the form of a signal processor (also referred to as "SIP"), wherein the algorithmic implementation corresponds to field-oriented control. The second braking control unit 130 can be in the form of a field programmable gate array (FPGA), wherein the algorithmic implementation corresponds to switching-oriented control.

In accordance with an alternative embodiment, the second braking control unit 130 is embodied in such a way that the activation of the power supply unit of the drive unit 116 takes place exclusively by a functionality implemented by means of hardware, without the use of software, while the first braking control unit 128 is based on a hardware-based and software-based implementation of the control functions.

If the two braking control units 128, 130 are based on a software-base implementation in respect of at least one control function, the corresponding software is implemented differently in the braking control units 128, 130. In this case, in particular the programming codes provided for executing the control function differ by virtue of the codes being established by different people and/or different tools, for example.

Owing to these differences, which apply to the control function of the braking control units in the respective braking mode, each of the braking control units 128, 130 can monitor the braking effect of the first brake 24 in the first braking mode thereof in each case in accordance with an individual method, which differs from the methods of the other braking control unit. The braking control units 128, 130 of the braking regulation unit 122 of the second brake 124 accordingly correspond in terms of the implementation of monitoring functions to two monitoring devices 127, 129 of the braking monitoring apparatus 53, which two monitoring devices differ from one another in terms of the above-described features. In particular, they differ from one another with respect to their structural and/or algorithmic design. If they each have software for executing monitoring functions, this software is implemented differently.

The monitoring unit 56 is based on a technology which differs from the technologies of the braking control units 128, 130 or the monitoring devices 127, 129. For example, the monitoring unit 56 can be based on CPLD ("Complex Programmable Logic Device") technology. The monitoring of the braking effect generated by the first brake 24 can accordingly take place in accordance with a method which differs from the methods of the braking control units 128, 130 or monitoring devices 127, 129.

The monitoring task to be performed by each braking control unit 128, 130 and by the monitoring unit 56 consists in determining, on the basis of the braking effect characteristic quantity B1, whether the braking effect generated by the first brake 24 in the first braking mode thereof is sufficient. Owing to the different technologies, in the exemplary embodiment under consideration the monitoring mechanism with which the braking control units 128, 130 and the monitoring unit 56 are equipped for implementing the first monitoring function is realized in each case in a different way and is different for each of these units. In particular, the different monitoring mechanisms can be realized by different monitoring software. The monitoring task is therefore performed largely separately, in particularly completely separately, in each case by means of a different method, i.e. by means of a different implementation of the task by these units.

As already mentioned above, in a particular embodiment a plurality of braking effect characteristic quantities can be detected by the senior unit 58, which braking effect characteristic quantities differ from one another in terms of their type and are each evaluated by a different unit of the braking monitoring apparatus 53. The type of braking effect characteristic quantities is in this case determined by the technology of the respective unit of the braking monitoring apparatus 53.

The braking control units 128, 130 of the second brake 124, i.e. the monitoring devices 127, 129 and the monitoring unit 56, are each provided for outputting an error signal during performance of this monitoring task depending on the first braking effect characteristic quantity B1 or on the respective braking effect characteristic quantity. This error signal is output by each of these units if the evaluation of the braking effect characteristic quantity B1 or of the respective braking effect characteristic quantity by the respective unit has the result that an insufficient braking effect of the first brake 24 in the first braking mode thereof is considered to be identified. Owing to the different implementation of the monitoring task in each of the mentioned units, a largely independent, in particular completely independent output of an error signal by the units of the braking monitoring apparatus 53 can take place.

The actuation of the switching unit 32 as described above only takes place when at least two error signals are output. For this purpose, a trigger unit 60 is used which, as part of the first braking monitoring apparatus 53, is operatively connected to an output of the braking control units 128, 130 (or monitoring units 127, 129) and the monitoring unit 56, on one side, and to the switching unit 32, in particular to the actuator 33, on the other side. The trigger unit 60 (also referred to as "Voter" device) has three lines connected in parallel with one another, which lines are electrically connectable to a common voltage source 62 and jointly to the actuator 33. In each case two switches are arranged in each line, wherein the switches are in an open position during performance of the monitoring task by the braking control units 128, 130 and the monitoring unit 56, and therefore in the first braking mode of the first brake 24. As a result, an electrical connection between the voltage source 62 and the actuator 33 is disconnected. This electrical connection can be produced by closing both switches in at least one line, as a result of which the switching unit 32 is actuated. The switches are each closed by means of an error signal, which is present at the output of a unit of the braking monitoring apparatus 53. In each line, the switches are each operatively connected to a different unit, with the result that closing of both switches in this line and therefore the actuation of the switching unit 32 only take place when an error signal is output by two different units of the braking monitoring apparatus 53.

The monitoring task, namely the individual evaluation of the braking effect characteristic quantity B1 or of the respective braking effect characteristic quantity by the braking control units 128, 130 and the monitoring unit 56 is performed by these units largely independently of one another, as described above. The monitoring function comprises this monitoring task and is performed by the actuation of the switching unit 32 by an interaction of the units of the braking monitoring apparatus 53, i.e. the monitoring devices 127, 129 and the monitoring unit 56, in particular by a combination of the results of the individual monitoring tasks.

With the actuation of the switching unit 32, when there is an insufficient braking effect of the first electrodynamic brake 24 in the first braking mode thereof, a fallback measure is initiated, which corresponds to the second braking control unit 30 taking on the control of the power supply unit 20 as described further above.

The braking monitoring apparatus 53 is provided, in particular programmed, with a second monitoring function, in which it is in the form of a second braking effect monitoring unit 52, in addition to the above-described control tasks of the braking control units 128, 130 for controlling the power supply unit of the drive unit 116 (see FIG. 2), which second braking effect monitoring unit 52 is provided for monitoring the first brake 24 in the second braking mode thereof.

This second monitoring function is based on a monitoring task which is performed largely separately by each of the braking control units 128, 130 and the monitoring unit 56 and is identical to the monitoring task of the first monitoring function. The second monitoring function differs from the first monitoring function by way of the use of a further trigger unit 64, which, as part of the braking monitoring apparatus 53, is operatively connected to an output of the braking control units 128, 130 or the monitoring unit 56, on one side, and to the switching device 54 (see also FIG. 2), in particular to the actuator 55 thereof. The trigger unit 64 (also referred to as the "Voter" device) has three series-connected pairs of parallel lines, which are electrically connectable to the common voltage source 62 and jointly to the actuator 55. For each pair of lines, in each case one switch is arranged in both lines, wherein the switches are in a closed position during the performance of the monitoring task by the braking control units 128, 130 and the monitoring unit 56, and therefore during the second braking mode of the first brake 24. As a result, an electrical connection is produced between the voltage source 62 and the actuator 55. This electrical connection can be interrupted by opening both switches in at least one line pair, as a result of which the switching unit 54 is actuated.

The switches are each opened by means of an error signal, which is present at the output of a unit of the braking monitoring apparatus 53. In each line pair, the switches are in each case operatively connected to a different unit, with the result that opening of both switches in this line pair and therefore the actuation of switching device 54 only take place when an error signal is output by two different units of the braking monitoring apparatus 53.

During the second braking mode of the first brake 24, the switching unit 54 is in a closed position, as a result of which an electrical connection between a voltage source 66 and the braking apparatus 17 is produced. In this case a signal "release of the braking apparatus 17" is set. If the switching unit 54 is actuated, this electrical connection is disconnected, as a result of which a signal "application of the braking apparatus 17" is generated.

The figure also shows a control line 67, by means of which the braking apparatus 17 can be actuated at any time by means of a command by the vehicle driver.

The monitoring task, namely the individual evaluation of the braking effect characteristic quantity B1 or the respective braking effect characteristic quantity by the braking control units 128, 130 and by the monitoring unit 56 is performed by these units largely independently of one another, as described above. The monitoring function comprises this monitoring task and is performed by the actuation of the switching unit 54 by interaction of these units, in particular by a combination of the results of the individual monitoring tasks.

With the actuation of the switching device 54, when the braking effect of the first electrodynamic brake 24 in the second braking mode thereof is insufficient a fallback measure is initiated, which corresponds to the actuation of the mechanical brake 17 described further above. The second braking mode should continue to take effect until the braking operation is at an end.

During implementation of the first braking mode, in which the first monitoring function can be performed by means of the trigger unit 60, the trigger unit 64 provided for the second monitoring function is inactive by virtue of a permanent electrical connection, which is independent of the configuration of the trigger unit 64, being produced between the voltage source 62 and the actuator 55. This electrical connection is interrupted by a switch 68 on transfer to the second braking mode, which switch is opened during actuation of the switching unit 32 by the actuator 33. The electrical connection then only remains via the trigger unit 64, which is therefore set to an active state.

During the implementation of the second braking mode, in which the second monitoring function can be performed by means of the trigger unit 64, the trigger unit 60 provided for the first monitoring function is inactive by virtue of a permanent electrical connection, which is independent of the configuration of the trigger unit 60, being produced between a voltage source 70 and the actuator 33. In addition, a resetting unit 72 is provided for the switching unit 32, which resetting unit is used for bringing the first braking control unit 28 back into operation after the end of the second braking mode or after completion of a braking operation by means of the braking apparatus 17. This takes place by means of a signal S, which actuates an actuator 74, by means of which a switch 76 disconnects the electrical connection of the actuator 33 to the voltage source 70. With this disconnection, activation of the actuator 33 takes place, which actuator performs the following switching operations: the switching unit 32 is reset, with the result that the braking control unit 28 is again operatively connected to the power supply unit 20; the switch 68 is actuated, with the result that an electrical connection between the voltage source 62 and the actuator 55 is produced, and as a result, the trigger unit 64 is deactivated; a switch 78 disconnects an electrical connection between a voltage source 80 and the actuator 74, with the result that the resetting unit 72 is deactivated or no actuation of the switch 76 by the actuator 74 by means of the signal S can take place. Actuation of the switch 78 for activating the resetting unit 72 presupposes an end of the state which has resulted in response of the monitoring.

The first and second monitoring functions which are performed by the braking monitoring apparatus 53 belong to a first monitoring mode of the braking device of the rail vehicle 10, in which the first brake 24 is monitored. In this case, a monitoring role for initiating one of the above-described fallback measures relating to the first brake 24 is assumed by the second brake 124, in particular by the braking regulation unit 122 thereof.

The braking device of the rail vehicle 10 is provided with a second monitoring mode, in which the second brake 124 is monitored. In the exemplary embodiment under consideration, a monitoring role for initiating one of the above-described fallback measures relating to the second brake 124 is assumed by the first brake 24, in particular by the braking regulation unit 22 thereof. The braking regulation unit 22 of the first brake 24 forms, together with the monitoring unit 56, a second braking monitoring apparatus 153, which is provided for taking into consideration a braking effect characteristic quantity B2 for initiating a fallback measure relating to the second brake 124. The braking monitoring device 153 is provided with two monitoring functions, in the same way as the braking monitoring apparatus 53, which two monitoring functions are each provided for monitoring the second brake 124 during implementation of the first braking mode or second braking mode thereof. The braking control units 28, 30, when implementing the monitoring functions, are in the form of monitoring devices 27, 29 of the braking monitoring apparatus 153. During the implementation of the first monitoring function and the second monitoring function, the braking monitoring apparatus 153 is in the form of a braking effect monitoring unit 150 or 152 for the first or second braking mode of the braking regulation unit 122 of the second brake 124. This monitoring takes place depending on a second braking effect characteristic quantity B2 or on a plurality of braking effect characteristic quantities which are different from one another in terms of their type, which braking effect characteristic quantity or quantities is or are detected by a sensor unit 158. The above description relating to the sensor unit 58 applies correspondingly to the sensor unit 158.

In a particular embodiment, the sensor units 58 and 158 can be formed at least partially by an identical sensor structure, with respect to hardware.

For reasons of clarity, FIG. 3 only illustrates the monitoring of the first brake 24 by the second brake 124. The above description of the monitoring functions performed by the braking monitoring apparatus 53 can be used correspondingly for the first brake 24 with respect to the monitoring of the second brake 124. In this case, the corresponding monitoring functions are performed by the braking control units 28, 30 in their function as monitoring devices 27, 29 in interaction with the monitoring unit 56.

In the exemplary embodiment under consideration, the monitoring unit 56 is a common part of the first braking monitoring apparatus 53 and the second braking monitoring apparatus 153.

The implementation of the monitoring functions can take place in the braking control units 28, 30, 128, 130 in their functions as monitoring devices 27, 29, 127, 129 in each case by means of an arithmetic logic unit, which has an identical design to or different design from the arithmetic logic unit which is provided for implementing a braking mode.

Emergency braking by means of the electrodynamic brakes 24, 124 can be triggered by the interface to the vehicle emergency braking line 42. With the safety level which can be achieved by the proposed design of the rail vehicle braking device, in particular given a design of the braking regulation units with at least two braking control units, a rail vehicle with an emergency braking apparatus can be provided, wherein emergency braking can take place exclusively by means of the electrodynamic brakes with a sufficient safety level. As a result, it is advantageously possible to dispense with a full-service, additional friction brake. For lower velocities, only a parking brake, for example in the form of a spring-loaded brake, which prevents the parked vehicle on a slope from rolling away as a result of a frictional force generated by means of a spring energy store, can be maintained as friction brake. Thus, a considerable reduction in the costs of braking components and the weight of the rail vehicle can be achieved.

Figure 4:
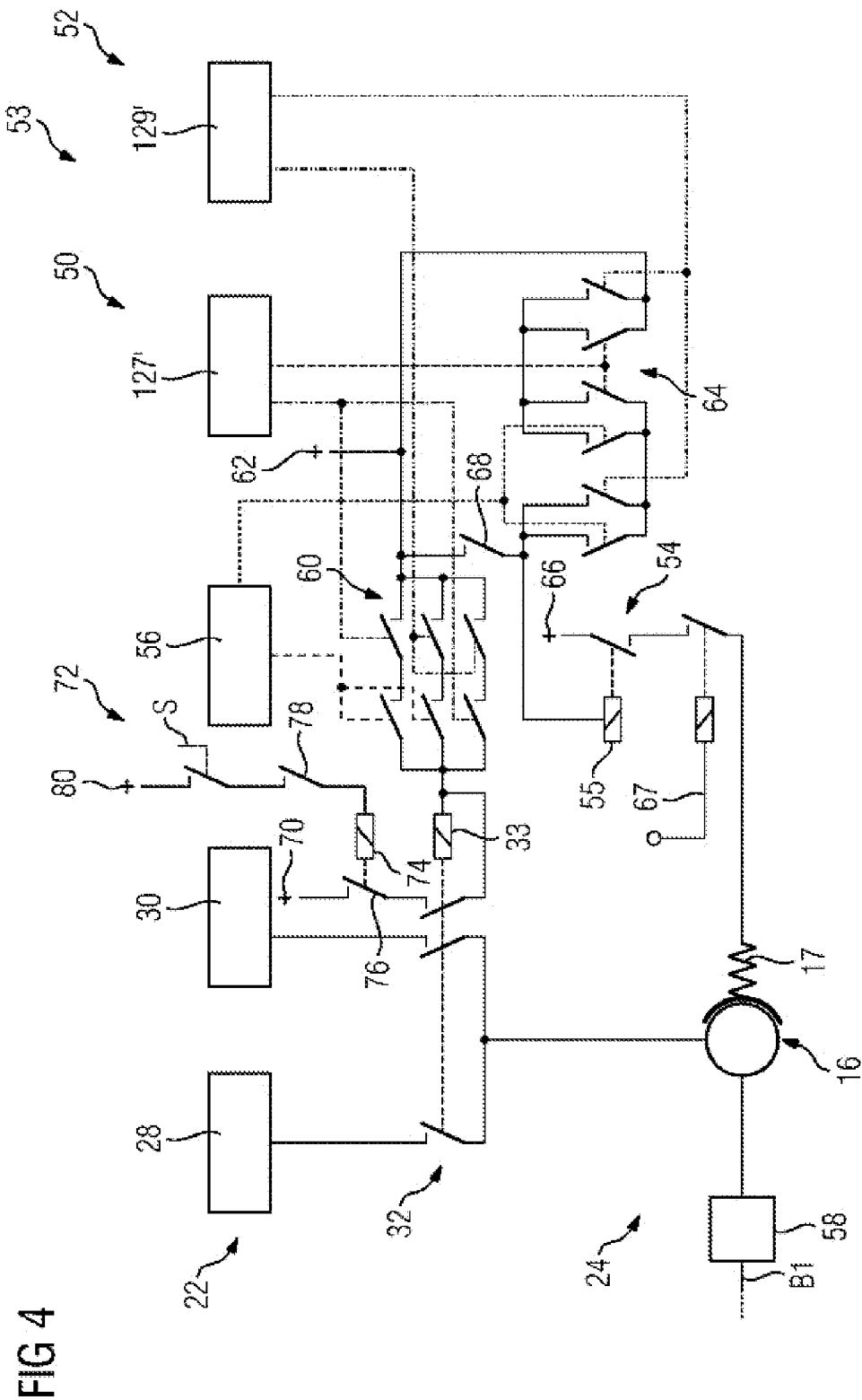
FIG. 4 shows an alternative embodiment of the circuits shown in FIG. 3.

FIG. 4 shows a variant embodiment in which the braking monitoring apparatus 53 has two monitoring devices 127' and 129'. Said monitoring devices are assigned to the first brake 24 and are independent of a further brake of the rail vehicle 10, in particular of the second brake 124. This variant embodiment differs from the embodiment of the monitoring devices 127, 129 shown in FIG. 3 in that said monitoring devices deviate from a design as braking control unit. They can in particular be provided exclusively for the implementation of the monitoring functions of the braking monitoring apparatus 53, which therefore deviates from a role as braking regulation unit. In respect of the implementation of the monitoring functions and interaction with the monitoring unit 56, reference is made to the above description relating to the monitoring devices 127, 129 so as to avoid unnecessary repetition.

Figure 5:
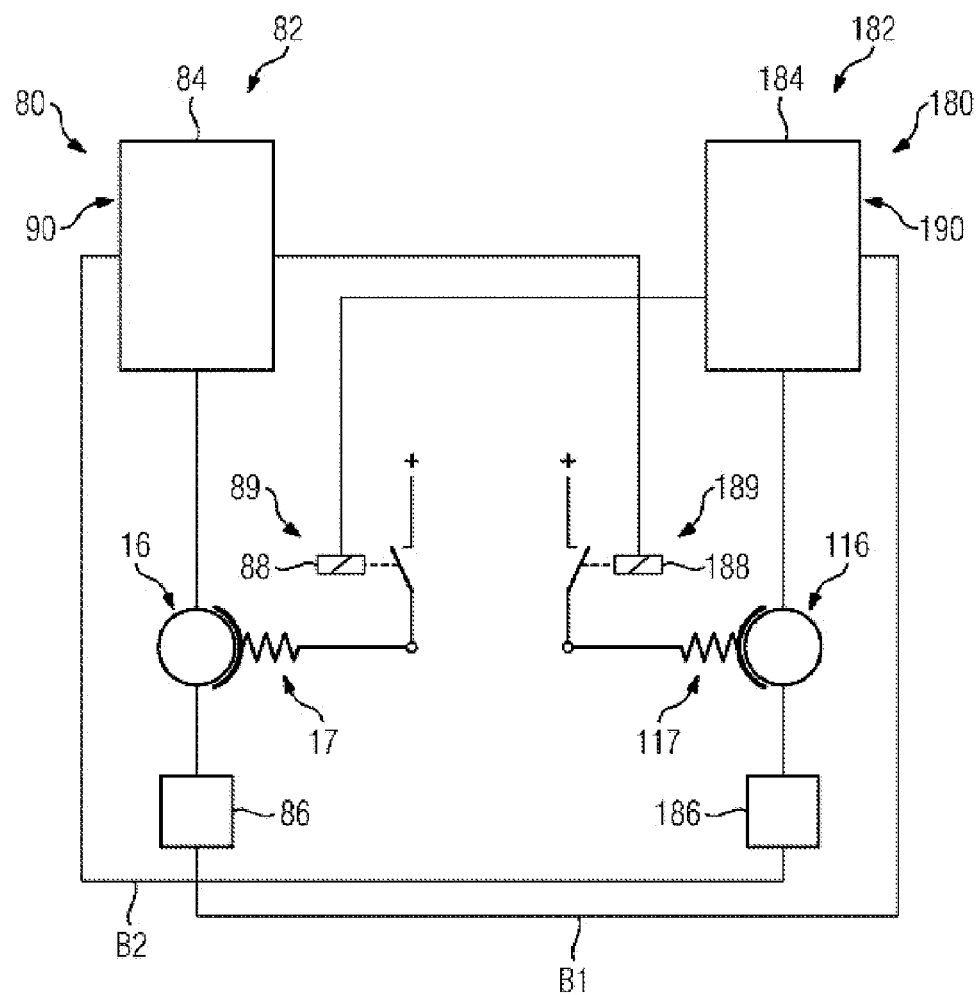
FIG. 5 shows an alternative embodiment of control circuits having monitoring functions.

FIG. 5 shows an alternative embodiment of two electrodynamic brakes 80, 180 of the rail vehicle 10. The first brake 80 is formed by the drive motor 18 of the drive unit 16 and a braking regulation unit 82, which comprises the power supply unit 20 of the drive unit 16 and a braking control unit 84, which, in a braking mode, controls the power supply unit 20 so as to provide a braking effect. The second brake 180 is formed by the drive motor of the drive unit 116 and a braking regulation unit 182, which comprises the power supply unit of the drive unit 116 and a braking control unit 184, which, in a braking mode, controls the power supply unit of the drive unit 116 so as to provide a braking effect.

In contrast to the embodiment of the previous figures, the braking regulation units 82 and 182 each have a single braking control unit 84 and 184, respectively. For the control function of the braking control units 84, 184 in the braking mode, the description above relating to the braking control units 28 and/or 30 finds corresponding application.

In addition to the control functions of the braking control unit, the braking control unit 84 of the first brake 80 is provided with a monitoring function for implementing a first monitoring mode of the braking apparatus of the rail vehicle 10, in which monitoring function it monitors the second brake 180 during the implementation of the braking mode thereof and initiates a fallback measure for the second brake 180 depending on a braking effect characteristic quantity B2. In this case, the braking regulation unit 82 of the first brake 80 acts as braking monitoring apparatus 90 for the second brake 180. The braking effect characteristic quantity B2 is sensed by a sensor unit 186, which is operatively connected to the braking control unit 84. The above description relating to the sensor unit 58 finds corresponding application for the sensor unit 186 and the sensor unit 86 described further below. If, in the case of evaluation of the braking effect characteristic quantity B2 by the braking control unit 84, it results that the braking effect generated by the second brake 180 is insufficient, a fallback measure for the second brake 180 is initiated by the braking control unit 84 by virtue of, for example, the braking apparatus 117 being activated by means of an actuator 188 of a switching device 189.

In addition to its control functions, the braking control unit 184 of the second brake 180 is provided with a monitoring function for implementing a second monitoring mode of the braking device of the rail vehicle 10, in which monitoring function it monitors the first brake 80 during the implementation of the braking mode thereof and initiates a fallback measure for the first brake 80 depending on a braking effect characteristic quantity B1. In this case, the braking regulation unit 182 of the second brake 180 acts as braking monitoring apparatus 190 for the first brake 80. The braking effect characteristic quantity B1 is sensed by a sensor unit 86, which is operatively connected to the braking control unit 184. If, in the case of evaluation of the braking effect characteristic quantity B1 by the braking control unit 184, it results that the braking effect generated by the first brake 80 is insufficient, a fallback measure for the first brake 80 is initiated by the braking control unit 184 by virtue of, for example, the braking apparatus 17 being activated by means of an actuator 88 of a switching device 89.

In the embodiments shown in FIGS. 3 to 5, the drive units 16 and 116 can be assigned to an identical truck of the rail vehicle 10 or separate trucks. In the embodiment shown in FIG. 1, the drive units 16, 116 are each assigned to a different truck. In this case, the drive axles 14 of an identical truck are each driven by a dedicated drive motor, wherein both drive motors are supplied power by the same power supply unit. In the case of the braking devices shown in FIGS. 3 to 5, in this embodiment the electrodynamic brakes 24, 124 and 80, 180, respectively, are then in each case assigned to different trucks and therefore a plurality of drive axles. Accordingly, truck-wise localization of a braking effect loss can be achieved by the braking monitoring apparatuses 53, 153, 90, 190 and a fallback measure in relation to the respective truck can be initiated in differentiated fashion.

In an alternative embodiment, a drive motor is provided for each driven axle of a truck, wherein in each case one different power supply unit is provided for each drive motor of this truck. In this embodiment, accordingly in each case a separate electrodynamic brake is assigned to each driven axle of the truck. In the case of the braking devices shown in FIGS. 3 to 5, in this embodiment the electrodynamic brakes 24, 124 and 80, 180, respectively, are then assigned to an identical truck or in each case to a different drive axle in this truck. Accordingly, axle-wise localization of a braking effect loss can be achieved by the braking monitoring apparatuses 53, 153, 90, 190 and a fallback measure in relation to the respective drive axle can be initiated in differentiated fashion.

The invention claimed is:

1. A rail vehicle braking device, comprising:
at least one first electrodynamic brake having a drive unit with at least one drive motor and a power supply unit for supplying power to the drive motor in a traction mode of said drive unit, and having at least one closed-loop braking control unit containing the respective said power supply unit and at least one braking control unit, which, in a first braking mode, controls the respective said power supply unit to provide a braking effect;
at least one sensor unit configured to detect at least one braking effect characteristic quantity for the first braking mode of the electrodynamic brake; and
at least one first braking monitoring apparatus, assigned to said at least one first electrodynamic brake, and being independent of said closed-loop braking control unit, said at least one first braking monitoring apparatus being configured for taking into consideration the braking effect characteristic quantity for initiating a fallback measure relating to the brake in a first monitoring mode.

2. The rail vehicle braking device according to claim 1, wherein said braking monitoring apparatus has at least two monitoring devices.

3. The rail vehicle braking device according to claim 2, wherein said monitoring devices are configured for implementing, at least partially in interaction, at least one monitoring function of the first monitoring mode.

4. The rail vehicle braking device according to claim 2, wherein said monitoring devices are different from one another with respect to a structural and/or algorithmic design thereof.

5. The rail vehicle braking device according to claim 2, wherein each of said monitoring devices has software for executing a monitoring function, and wherein said software is implemented differently in said monitoring devices.

6. The rail vehicle braking device according to claim 2, which comprises a monitoring unit configured for performing the first monitoring mode at least partially in interaction with said monitoring devices.

7. The rail vehicle braking device according to claim 6, wherein said monitoring devices and said monitoring unit differ from one another with respect to a structural and/or algorithmic design thereof.

8. The rail vehicle braking device according to claim 2, wherein said monitoring devices of said braking monitoring apparatus and said monitoring unit are each configured for outputting an error signal during execution of the first monitoring mode depending on a braking effect characteristic quantity, wherein said braking monitoring apparatus has at least one trigger unit, which is operatively connected to said monitoring devices and said monitoring unit in such a way that an initiation of the fallback measure presupposes a presence of at least two error signals.

9. The rail vehicle braking device according to claim 1, wherein said closed-loop braking control unit has at least two braking control units and a switching unit, which is provided for switching over between the first braking mode of the closed-loop braking control unit, in which the first braking control unit controls the power supply unit so as to provide a braking effect, and a second braking mode of the closed-loop braking control unit, in which the second braking control unit controls the power supply unit so as to provide a braking effect, in order to implement the fallback measure.

10. The rail vehicle braking device according to claim 9, wherein said braking monitoring apparatus, in the first monitoring mode, has a first monitoring function, in which said braking monitoring apparatus is in the form of a first braking effect monitoring unit configured for monitoring the brake in the first braking mode thereof, and at least one second monitoring function, in which this braking monitoring apparatus is in the form of a second braking effect monitoring unit configured for monitoring the brake in the second braking mode thereof.

11. The rail vehicle braking device according to claim 1, which comprises a further braking apparatus and a switching device, wherein, as fallback measure, said further braking apparatus is actuated by said switching device depending on the braking effect characteristic quantity.

12. The rail vehicle braking device according to claim 1, which comprises at least one second electrodynamic brake having a drive unit with at least one drive motor and a power supply unit for supplying power to the drive motor in a traction mode of said drive unit, and at least one closed-loop braking control unit, having the respective said power supply unit and at least one braking control unit, which, in a first braking mode, controls the respective power supply unit so as to provide a braking effect.

13. The rail vehicle braking device according to claim 12, which comprises at least one sensor unit disposed to detect at least one braking effect characteristic quantity for the first braking mode of said second brake, and at least one second braking monitoring apparatus, which is assigned to the second brake, is independent of said closed-loop braking control unit of said second brake and is provided for taking into consideration the braking effect characteristic quantity for initiating a fallback measure relating to said second brake in a second monitoring mode.

14. The rail vehicle braking device according to claim 13, which comprises a monitoring unit, forming a common part of said first braking monitoring apparatus and said second braking monitoring apparatus.

15. The rail vehicle braking device according to claim 12, wherein said first braking monitoring apparatus that is assigned to said first brake is formed at least by said closed-loop braking control unit of said second brake.

16. The rail vehicle braking device according to claim 15, wherein said closed-loop braking control unit of said second brake has at least two braking control units and a switching unit, which is provided for switching over between the first braking mode of said closed-loop braking control unit, in which the first braking control unit controls the respective power supply unit so as to provide a braking effect, and a second braking mode of the closed-loop braking control unit, in which the second braking control unit controls the respective power supply unit so as to provide a braking effect, in order to implement the fallback measure, wherein said monitoring devices of said first braking monitoring apparatus are each formed by a different braking control unit of said closed-loop braking control unit of said second brake forming the braking monitoring apparatus.

17. The rail vehicle braking device according to claim 15, wherein said second braking monitoring apparatus assigned to said second brake is formed at least by said closed-loop braking control unit of said first brake.

18. The rail vehicle braking device according to claim 2, wherein said closed-loop braking control unit of said second brake has at least two braking control units and a switching unit, which is provided for switching over between the first braking mode of said closed-loop braking control unit, in which the first braking control unit controls the respective power supply unit so as to provide a braking effect, and a second braking mode of the closed-loop braking control unit, in which the second braking control unit controls the respective power supply unit so as to provide a braking effect, in order to implement the fallback measure, wherein said monitoring devices of said first braking monitoring apparatus are each formed by a different braking control unit of said closed-loop braking control unit of said second brake forming the braking monitoring apparatus.

19. A method for braking a rail vehicle with a first electrodynamic brake, the brake having in each case a drive unit, which has at least one drive motor and a power supply unit for supplying power to the drive motor in a traction mode of the drive unit, and at least one closed-loop braking control unit, which has the respective power supply unit and at least one braking control unit, the method comprising the following steps:
  controlling the power supply unit of the first brake so as to provide a braking effect in a first braking mode thereof;
  detecting at least one first braking effect characteristic quantity for the first braking mode of the first brake;
  in a first monitoring mode, taking the first braking effect characteristic quantity into consideration with a first braking monitoring apparatus, which is assigned to the first brake and is independent of the braking regulation unit; and
  initiating a fallback measure relating to the first brake depending on the first braking effect characteristic quantity.

* * * * *